(12) United States Patent (10) Patent No.: US 12,666,120 B2
Su (45) Date of Patent: Jun. 23, 2026

(54) ELECTRONIC DEVICE AND THUMBNAIL GENERATION METHOD FOR SCREEN RECORDING VIDEO THEREOF

(71) Applicant: ASUSTeK COMPUTER INC., Taipei City (TW)

(72) Inventor: Shih-Wei Su, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 161 days.

(21) Appl. No.: 18/502,089

(22) Filed: Nov. 6, 2023

(65) Prior Publication Data

US 2024/0251143 A1 Jul. 25, 2024

(30) Foreign Application Priority Data

Jan. 19, 2023 (TW) ................................ 112102556

(51) Int. Cl.
 *H04N 21/84* (2011.01)
 *G06V 20/40* (2022.01)
 *H04N 21/433* (2011.01)
 *H04N 21/8549* (2011.01)
(52) U.S. Cl.
 CPC ......... *H04N 21/8549* (2013.01); *G06V 20/44* (2022.01); *H04N 21/4334* (2013.01); *H04N 21/84* (2013.01); *G06V 2201/10* (2022.01)

(58) Field of Classification Search
None
See application file for complete search history.

(56) References Cited

U.S. PATENT DOCUMENTS

2007/0294295 A1 12/2007 Finkelstein et al.
2012/0192234 A1* 7/2012 Britt ................... H04N 21/4882
725/98

FOREIGN PATENT DOCUMENTS

CN 113382312 9/2021
CN 113382312 A * 9/2021 ............. A63F 13/52
CN 113852767 12/2021
TW 202107247 2/2021

* cited by examiner

*Primary Examiner* — Cai Y Chen
(74) *Attorney, Agent, or Firm* — JCIPRNET

(57) ABSTRACT

An electronic device and a thumbnail generation method for screen recording video thereof are provided. The method is adapted to the electronic device including a display and includes the following steps. A screen recording function is activated, and a screen recording video is generated. At least one event of an application present in the screen recording video is identified. A frame of the screen recording video is selected according to event information of one of the at least one event. A thumbnail of the screen recording video is generated using the frame associated with the application, and the thumbnail is displayed on a user interface via the display.

16 Claims, 8 Drawing Sheets

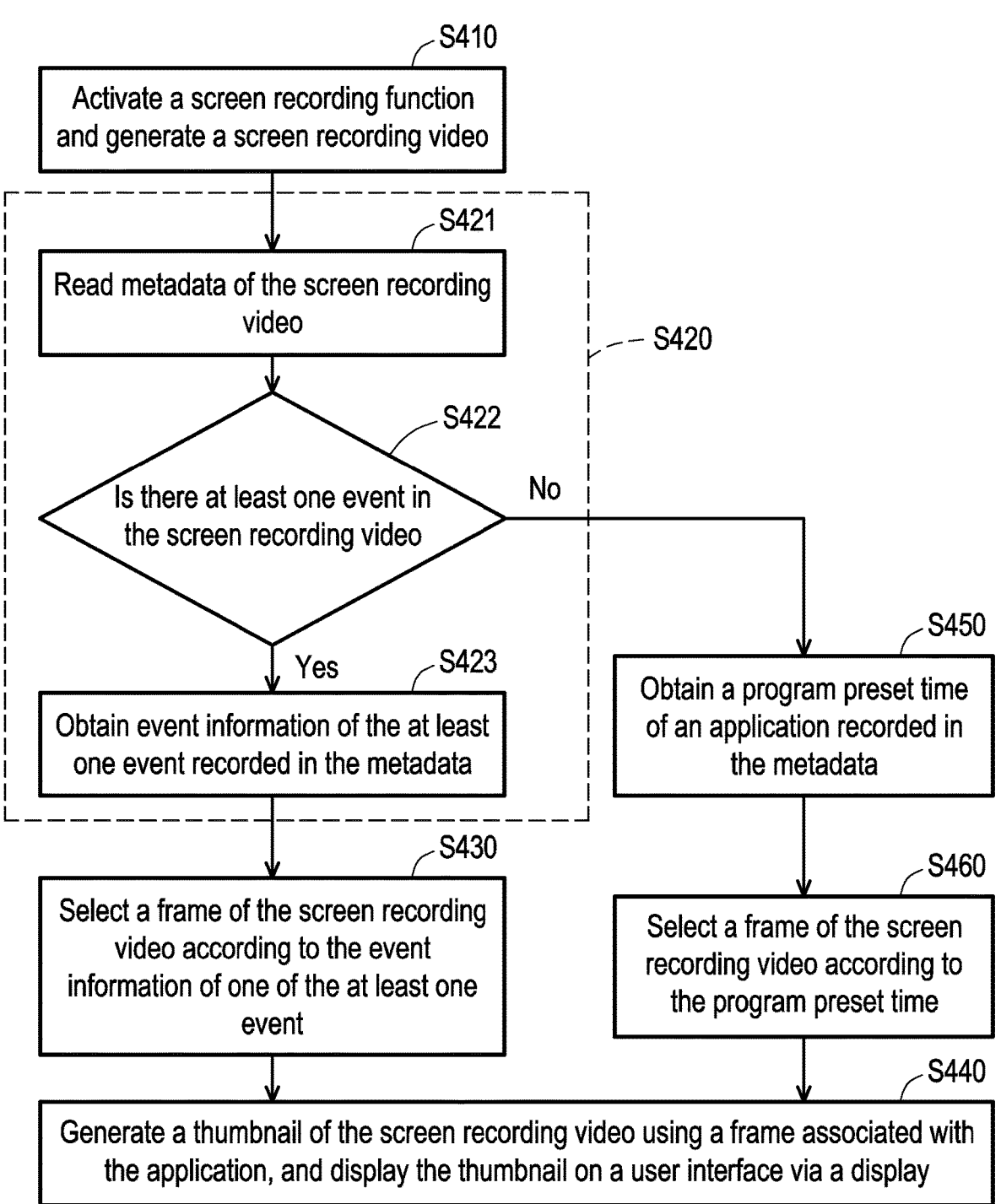

S410
Activate a screen recording function and generate a screen recording video

S421
Read metadata of the screen recording video

S420

S422
Is there at least one event in the screen recording video

No

S450
Obtain a program preset time of an application recorded in the metadata

Yes

S423
Obtain event information of the at least one event recorded in the metadata S430
Select a frame of the screen recording video according to the event information of one of the at least one event S460
Select a frame of the screen recording video according to the program preset time S440
Generate a thumbnail of the screen recording video using a frame associated with the application, and display the thumbnail on a user interface via a display

FIG. 4

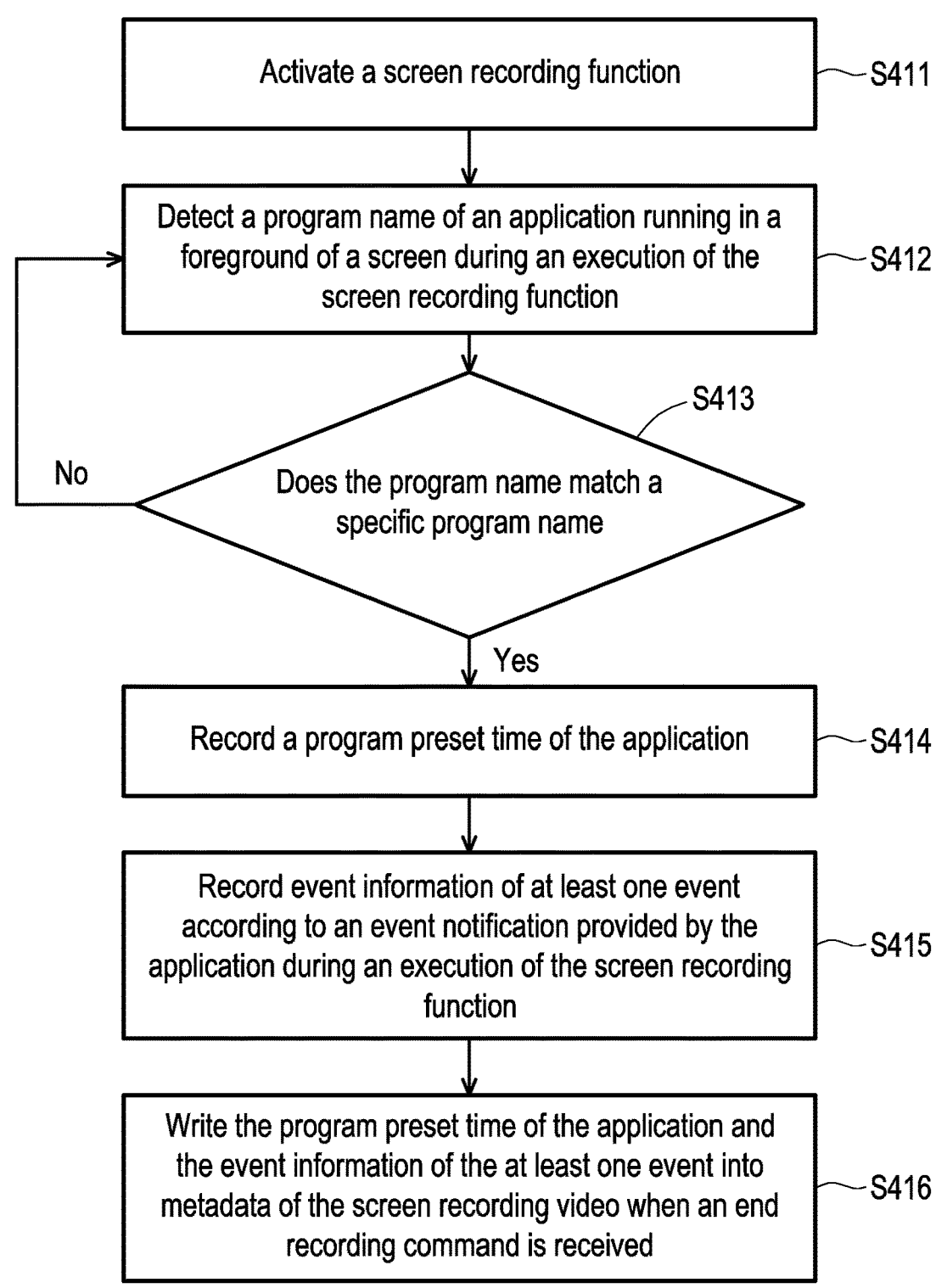

Activate a screen recording function ⟋S411

Detect a program name of an application running in a foreground of a screen during an execution of the screen recording function ⟋S412

S413

Does the program name match a specific program name

No

Yes

Record a program preset time of the application ⟋S414

Record event information of at least one event according to an event notification provided by the application during an execution of the screen recording function ⟋S415

Write the program preset time of the application and the event information of the at least one event into metadata of the screen recording video when an end recording command is received ⟋S416

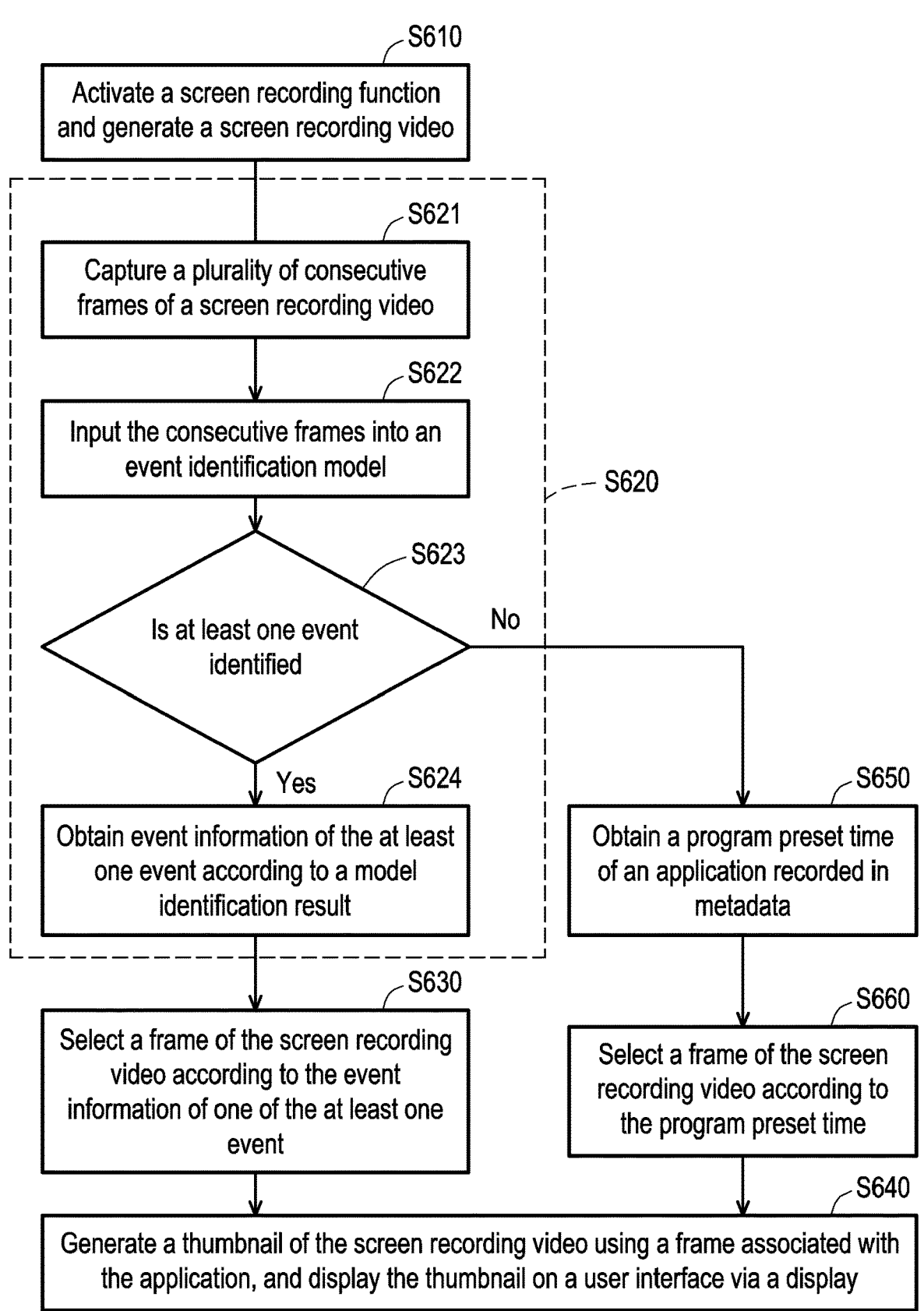

S610

Activate a screen recording function and generate a screen recording video

S621

Capture a plurality of consecutive frames of a screen recording video

S622

Input the consecutive frames into an event identification model

S620

S623

Is at least one event identified

No

Yes        S624

Obtain event information of the at least one event according to a model identification result

S650

Obtain a program preset time of an application recorded in metadata

S630

Select a frame of the screen recording video according to the event information of one of the at least one event

S660

Select a frame of the screen recording video according to the program preset time

S640

Generate a thumbnail of the screen recording video using a frame associated with the application, and display the thumbnail on a user interface via a display

FIG. 6

ELECTRONIC DEVICE AND THUMBNAIL GENERATION METHOD FOR SCREEN RECORDING VIDEO THEREOF

CROSS-REFERENCE TO RELATED APPLICATION

This application claims the priority benefit of Taiwan application serial no. 112102556, filed on Jan. 19, 2023. The entirety of the above-mentioned patent application is hereby incorporated by reference herein and made a part of this specification.

BACKGROUND OF THE INVENTION

Field of the Invention

The invention relates to an electronic device and a thumbnail generation method for screen recording video thereof.

Description of Related Art

With the advancement of technology, playing games with mobile electronic devices has become a very popular pastime. When a user is playing a game via a mobile electronic device, the game process may be recorded by means of screen recording. However, the thumbnails of the game recording videos displayed on the user interface are often images unrelated to the game, so users need to click on the game recording videos one by one to confirm whether they want to watch the game recording content.

SUMMARY OF THE INVENTION

The disclosure provides a thumbnail generation method for screen recording video adapted to an electronic device including a display. The method includes the following steps. A screen recording function is activated, and a screen recording video is generated. At least one event of an application present in the screen recording video is identified. A frame of the screen recording video is selected according to event information of one of the at least one event. A thumbnail of the screen recording video is generated using the frame associated with the application, and the thumbnail is displayed on a user interface via the display.

The disclosure further provides an electronic device including a display, a storage device, and a processor. The storage device records a plurality of modules, and the processor is coupled to the display and the storage device, and executes the modules to perform the following steps. A screen recording function is activated, and a screen recording video is generated. At least one event of an application present in the screen recording video is identified. A frame of the screen recording video is selected according to event information of one of the at least one event. A thumbnail of the screen recording video is generated using the frame associated with the application, and the thumbnail is displayed on a user interface via the display.

Based on the above, by identifying the events of the application in the screen recording video, a thumbnail of the screen recording video may be generated according to the event information of the identified event, and the thumbnail may be displayed on the user interface. In this way, the user may intuitively understand the video content of the screen recording video by viewing the thumbnail of the screen recording video, thereby significantly improving the operational convenience of browsing the screen recording video.

BRIEF DESCRIPTION OF THE DRAWINGS

FIG. 4 is a flowchart of a thumbnail generation method for screen recording video of an embodiment of the present application.

FIG. 5 is a flowchart of generating a screen recording video of an embodiment of the present application.

FIG. 6 is a flowchart of a thumbnail generation method for screen recording video of an embodiment of the present application.

DESCRIPTION OF THE EMBODIMENTS

Figure 1:
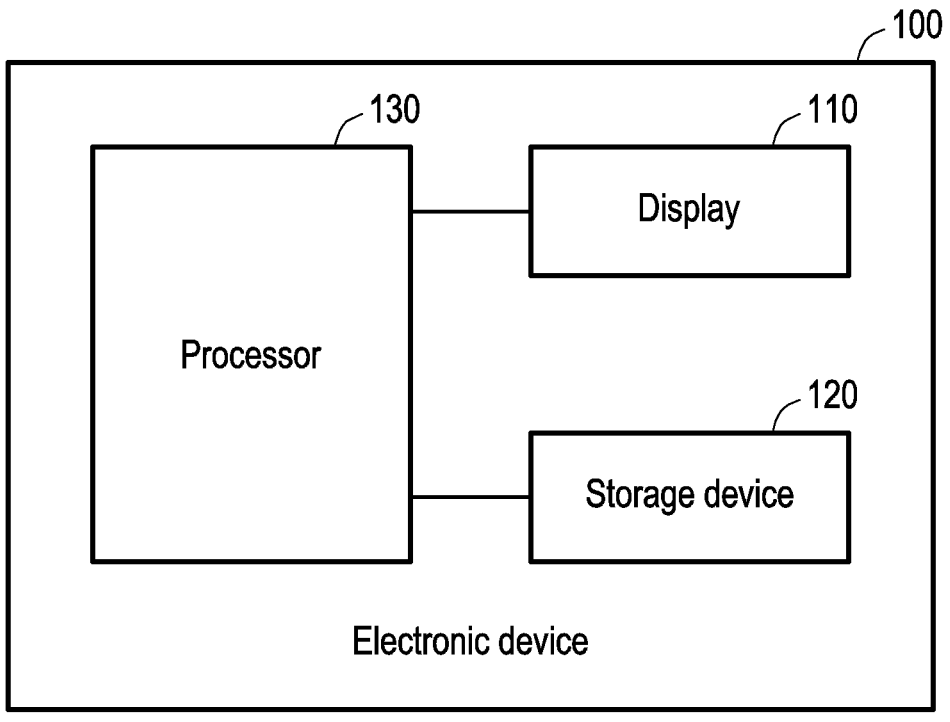
FIG. 1 is a schematic diagram of an electronic device of an embodiment of the present application.

Hereinafter, exemplary embodiments of the invention are described in detail, and examples of the exemplary embodiments are conveyed via the figures. Wherever possible, the same reference numerals are used in the figures and the descriptions to refer to the same or similar portions. These embodiments are only a portion of the disclosure and do not disclose all of the possible implementations of the disclosure. More precisely, these embodiments are only examples of the device and the method in the claims of the invention.

Please refer to FIG. 1, an electronic device 100 of the present embodiment is, for example, a portable electronic device having a display function such as a smart phone, a tablet computer, a game console, a notebook computer, and the invention is not limited thereto. The electronic device 100 includes a display 110, a storage device 120, and a processor 130. The processor 130 is coupled to the display 110 and the storage device 120. The functions thereof are respectively described as follows.

The display 110 is, for example, liquid-crystal display (LCD), light-emitting diode (LED) display, field-emission display (FED), organic light-emitting diode display (OLED), or other types of displays, and the disclosure is not limited thereto.

The storage device 120 is configured to store data such as a file, an image, a command, a program code, or a software module, and may be, for example, any type of fixed or removable random-access memory (RAM), read-only memory (ROM), flash memory, hard disk or other similar devices, an integrated circuit, or a combination thereof.

The processor 130 is, for example, a central processing unit (CPU), an application processor (AP), or other programmable microprocessors for conventional use or special use, a digital signal processor (DSP), a programmable controller, an application specific integrated circuit (ASIC), a programmable logic device (PLD), a graphics processing unit (GPU), other similar devices, or a combination of the devices. The processor 130 may execute the program code, software module, command, etc. recorded in the storage device 120, so as to implement the thumbnail generation method for screen recording video of the present embodiment. The software module may be broadly interpreted as meaning command, command set, code, program code, program, application, software package, thread, procedure, function, and the like.

In some embodiments, after the screen recording video is generated via the screen recording function, the electronic device 100 may generate a thumbnail of the screen recording video according to the application screen of the foreground application during the screen recording process. Therefore, by displaying the thumbnail on the user interface of the gallery application, the user of the electronic device 100 may quickly understand the relevant content of each screen recording video, thus avoiding the need to repeatedly click a plurality of thumbnails to find the screen recording video of interest. Especially, when the user records the game video using the screen recording function, the electronic device 100 may generate a thumbnail of the screen recording video according to the game screen of the game program.

Figure 2:
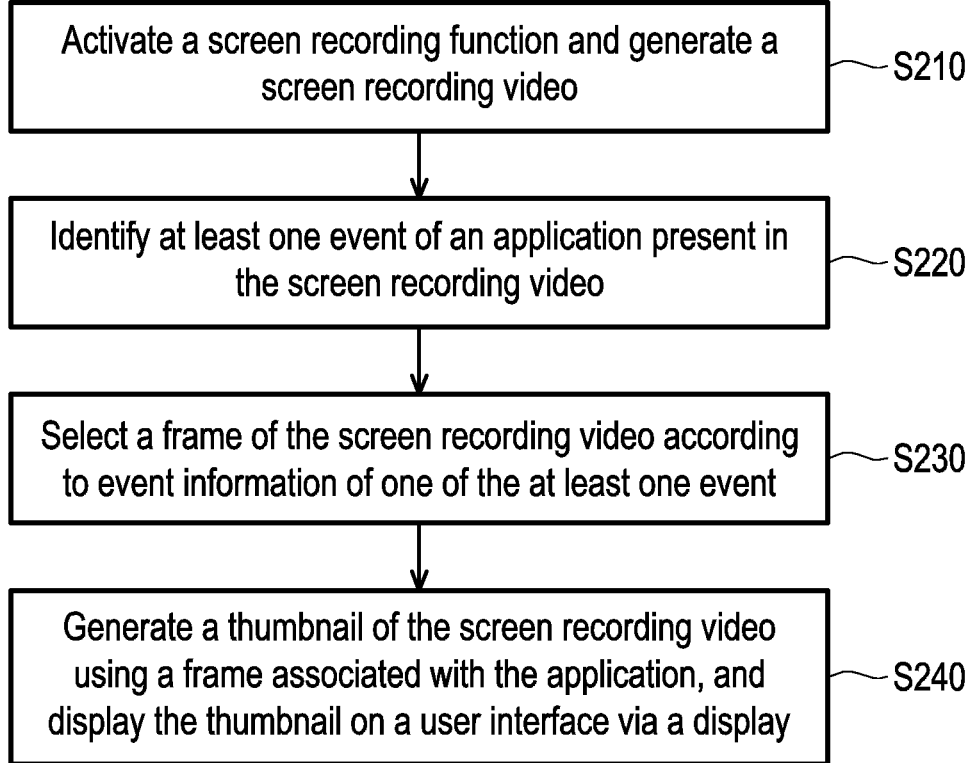
FIG. 2 is a flowchart of a thumbnail generation method for screen recording video of an embodiment of the present application.

Referring to FIG. 1 and FIG. 2, the method of the present embodiment is applicable to the electronic device 100 in the above embodiment. The detailed steps of the thumbnail generation method for screen recording video of the present embodiment are described below in conjunction with various elements in the electronic device 100.

In step S210, the processor 130 activates a screen recording function, and a screen recording video is generated. In some embodiments, in response to receiving a command to activate screen recording issued by the user, the processor 130 activates the screen recording function and starts to record the screen displayed by the display 110. For example, the user may perform a selection operation on an icon displayed on the desktop or a function menu to issue a command to start screen recording. Therefore, after the screen recording function is activated, the processor 130 continuously captures a plurality of frames displayed by the display 110 to generate a plurality of consecutive frames in the screen recording video.

In some embodiments, after the screen recording function is activated, the processor 130 may control the application to be executed in the foreground. When the application is executed in the foreground, the processor 130 displays the application screen of the application via the display 110. The application executed in the foreground may also be referred to as a foreground application. For example, after the screen recording function is activated, the processor 130 may control a game program to be executed in the foreground. When the game program is executed in the foreground, the display 110 may display the game screen, and the screen recording video generated by the processor 130 via the screen recording function may be a game video including a plurality of game screens.

In step S220, the processor 130 identifies at least one event of an application present in the screen recording video. In some embodiments, the application includes a game program, and the at least one event includes at least one game event. For example, the game event may be game start, game end, level pass, game victory, consecutive kill, game stunt performance, final score display, or other types of game events.

In some embodiments, in response to the occurrence of the at least one event, the application may itself provide an event notification of the at least one event, so that the processor 130 may record the event information of the at least one event in the metadata of the screen recording video. Or, in other embodiments, the event information of the at least one event may be recorded in other files. Thereby, the processor 130 may identify the at least one event of the application present in the screen recording video by viewing the metadata of the screen recording video or other files.

In some embodiments, the processor 130 may identify the at least one event of the application appearing in the screen recording video using a trained event identification model. The model parameters of the trained event identification model may be recorded in the storage device 120. Thereby, the processor 130 may identify the at least one event of the application present in the screen recording video according to the model identification result of the event identification model.

In step S230, the processor 130 selects a frame of the screen recording video according to event information of one of the at least one event. Specifically, after the at least one event of the application in the screen recording video is detected and identified, the processor 130 may obtain the event information of the at least one event. In some embodiments, the event information may include event identification information and event time information. The event identification information is, for example, an event identification code (ID). The event time information is, for example, the event occurrence time of the event corresponding to the recording timeline of the screen recording video.

In some embodiments, the processor 130 may select a frame corresponding to the event time information from the screen recording video according to the event time information. In some embodiments, the processor 130 may select one of at least one frame corresponding to the event time information. For example, assuming the event time information is "3 minutes 27 seconds" on the recording timeline of the screen recording video, the processor 130 may select one of the 30 frames corresponding to the time point "3 minutes 27 seconds" from the screen recording video. Alternatively, the processor 130 may select a frame having a playback time closest to the event time information from the screen recording video. For example, assuming the event time information is "3 minutes 27 seconds" on the recording timeline of the screen recording video, the processor 130 may select a frame having a playing time closest to the time point "3 minutes and 27 seconds" from the screen recording video. In other words, the processor 130 may select the frame having the event screen of the application according to the event time information.

In step S240, the processor 130 generates a thumbnail of the screen recording video using the frame associated with the application, and the thumbnail is displayed on a user interface via the display 110. In some embodiments, when the processor 130 determines that the event is present in the screen recording video, the processor 130 may generate a thumbnail of the screen recording video according to the frame associated with the event. Or, in some embodiments, when the processor 130 determines that the event is not present in the screen recording video, the processor 130 may generate the thumbnail of the screen recording video according to a specific application screen of the application. The above specific application screen may be selected according to a capture condition not related to the event. In addition, the processor 130 may downscale the image resolution and/or image size of the frame of the application to generate the thumbnail of the screen recording video.

Figure 3:
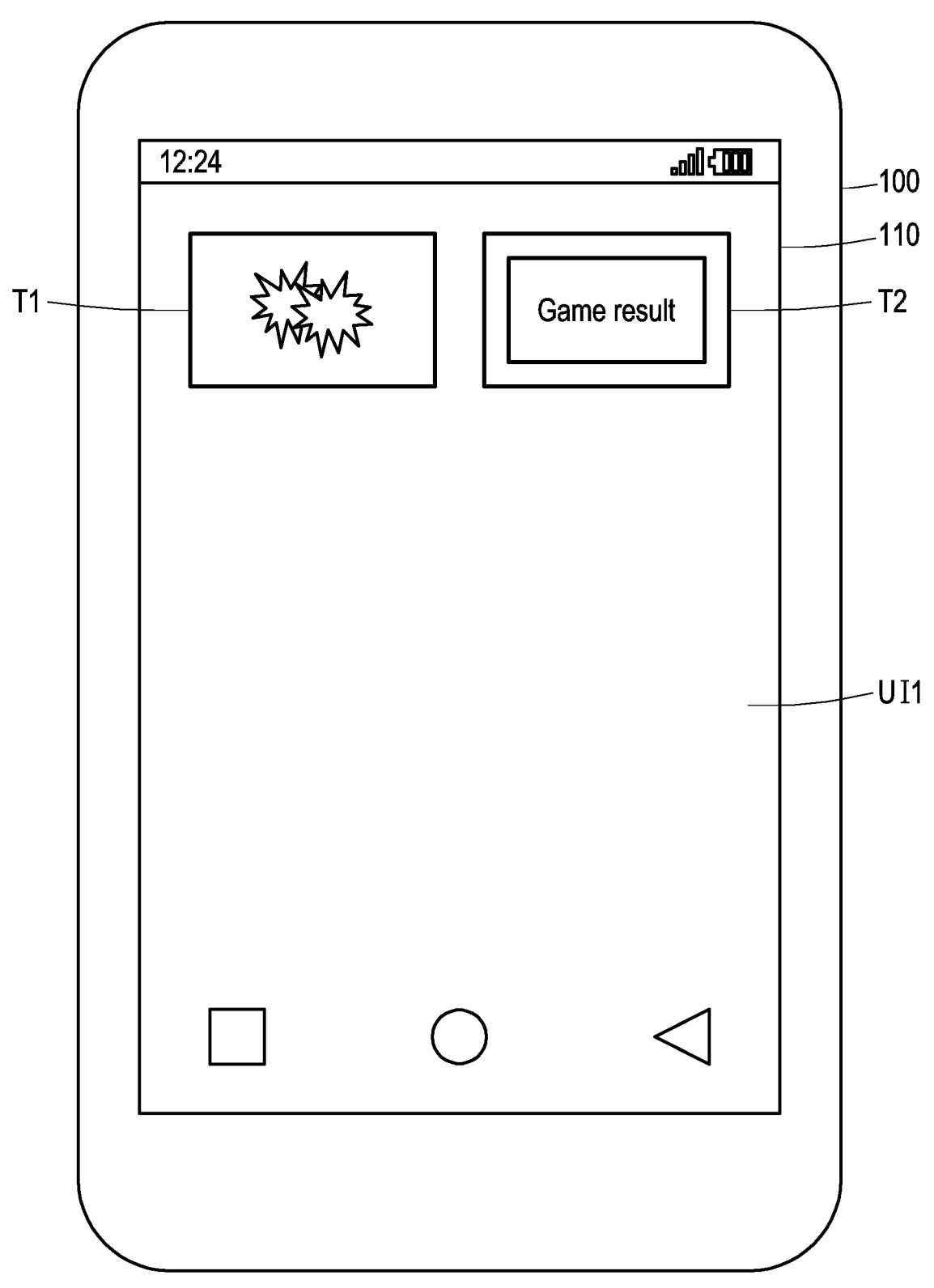
FIG. 3 is a schematic diagram of displaying a thumbnail of a screen recording video of an embodiment of the present application.

In some embodiments, the processor 130 may display the thumbnail of the screen recording video on the user interface of the application via the display 110. For example, FIG. 3 is a schematic diagram of displaying a thumbnail of a screen recording video of an embodiment of the invention. Referring to FIG. 3, the display 110 may display a user interface UI1. Taking the game screen of a recorded game program as an example, the processor 130 may generate thumbnails T1 and T2 of two recorded screen videos. Then, the processor 130 may present the thumbnails T1 and T2 of these screen recording videos on the user interface UI1 via the display 110. The thumbnails T1 and T2 present the event content of the game program. The user may quickly understand the video content of each screen recording video by looking at the thumbnails T1 and T2. In this way, the user may correctly select the thumbnail T1 or the thumbnail T2 to open the screen recording video that they really want to watch.

Referring to FIG. 1 and FIG. 4, the method of the present embodiment is applicable to the electronic device 100 in the above embodiments. The detailed steps of the thumbnail generation method for screen recording video of the present embodiment are described below in conjunction with various elements in the electronic device 100.

In step S410, the processor 130 activates a screen recording function, and a screen recording video is generated. In some embodiments, if the application may provide an event notification during execution, the processor 130 may write the event information of the at least one event in the screen recording video into the metadata of the screen recording video during the process of making the screen recording video into a specific video format file (e.g., MP4 format file). Therefore, the processor 130 may refer to the metadata of the screen recording video to identify whether the event occurs and the event type.

Specifically, please refer to FIG. 5. Step S410 may be implemented as step S411 to step S416. In some embodiments, the steps shown in FIG. 5 may be implemented by the processor 130 executing a screen recording program. That is, the operations of step S411 to step S416 may be implemented by a screen recording program.

In step S411, the processor 130 activates the screen recording function. In step S412, during the execution of the screen recording function, the processor 130 detects the program name of the application executed in the foreground of the screen. In step S413, the processor 130 determines whether the program name matches the specific program name. For example, the processor 130 may determine whether the foreground application is a game program in the game program list.

When the program name matches a specific program name (determined as yes in step S413), in step S414, the processor 130 records the program preset time of the application. For example, when the foreground application is a game program, the program preset time may be the game start time on the recording timeline. Alternatively, the program preset time may be the time when the application enters the foreground on the video recording timeline. Moreover, when the program name matches the specific program name (determined as yes in step S413), in step S415, during the execution of the screen recording function, the processor 130 records the event information of the at least one event according to the event notification provided by the application. In some embodiments, in response to an event notification including an event ID provided by the application during execution, the processor 130 may record the application ID of the event, the event ID, and the event occurrence time of the event on the recording timeline in the temporary storage area of the storage device 120.

In step S416, when an end recording command is received, the processor 130 may write the program preset time of the application and the event information of the at least one event into the metadata of the screen recording video. It should be mentioned that, in other embodiments, when the processor 130 determines that the event is not present in the screen recording video, the processor 130 omits the operation of writing the event information into the metadata of the screen recording video. In some embodiments, when the end recording command is received, the processor 130 stops the screen recording function, and the processor 130 writes the program preset time of the application in the temporary storage area into the metadata of the screen recording video. Similarly, in some embodiments, when the end recording command is received, the processor 130 stops the screen recording function, and the processor 130 writes the event information of the application in the temporary storage area into the metadata of the screen recording video. In this way, the metadata of the screen recording video may include event information having the program preset time of the application and one or a plurality of events, wherein the event information may include an application ID, an event ID (i.e., event identification information), and an event occurrence time of the event on the recording timeline (i.e., event time information). For example, the processor 130 may write the temporary data in the temporary storage area into the metadata of the MP4 format file in XMP format.

Returning to FIG. 4, in step S420, the processor 130 identifies at least one event of an application present in the screen recording video. In the present embodiment, step S420 may be implemented as step S421 to step S423.

In step S421, the processor 130 reads metadata of the screen recording video. In step S422, the processor 130 determines whether the at least one event is present in the screen recording video according to the metadata of the screen recording video. Specifically, if the at least one event is present in the screen recording video, the metadata of the screen recording video records the event information of the at least one event. Therefore, when the metadata of the screen recording video includes the event information, the processor 130 may determine that the at least one event is present in the screen recording video. In contrast, when the metadata of the screen recording video does not include the event information, the processor 130 may determine that the at least one event is not present in the screen recording video.

When the processor 130 determines that the at least one event is present in the screen recording video according to the metadata of the screen recording video (determined as yes step S422), in step S423, the processor 130 obtains the event information of the at least one event recorded in the metadata. Next, in step S430, the processor 130 selects a frame of the screen recording video according to the event information of one of the at least one event. The detailed implementation content of step S430 is described in the above embodiments, and is not repeated herein.

Moreover, when the processor 130 determines that the at least one event is not present in the screen recording video according to the metadata of the screen recording video (determined as no step S422), in step S450, the processor 130 obtains the program preset time of the application recorded in the metadata. In step S460, the processor 130 selects a frame of the screen recording video according to the program preset time. For example, when the program preset time is the game start time, the processor 130 may select the game start screen from the screen recording video according to the game start time on the recording timeline.

In step S440, the processor 130 generates a thumbnail of the screen recording video using the frame associated with the application, and the thumbnail is displayed on a user interface via the display 110. As described in the above embodiments, the processor 130 may convert the application screen including event content or not including event content into a thumbnail of the screen recording video, and display the thumbnail on the user interface. For example, the processor 130 may make a game start screen or a game event screen in the screen recording video as a thumbnail of the screen recording video.

In some embodiments, step S420 to step S460 shown in FIG. 4 may be implemented by the processor 130 executing a gallery application. That is, the operations of step S420 to step S460 may be implemented by a gallery application.

FIG. 6 is a flowchart of a thumbnail generation method for screen recording video of an embodiment of the invention. Referring to FIG. 1 and FIG. 6, the method of the present embodiment is applicable to the electronic device 100 in the above embodiments. The detailed steps of the thumbnail generation method for screen recording video of the present embodiment are described below in conjunction with various elements in the electronic device 100.

In step S610, the processor 130 activates a screen recording function, and a screen recording video is generated. In some embodiments, step S610 may be implemented by the processor 130 executing a screen recording program.

In step S620, the processor 130 identifies at least one event of an application present in the screen recording video. In the present embodiment, step S620 may be implemented as step S621 to step S624.

In step S621, the processor 130 captures a plurality of consecutive frames of the screen recording video. For example, the processor 130 may capture N consecutive frames (for example, N consecutive frames within 3 seconds) every M seconds (for example, 1 second) as model input data of an event identification model.

In step S622, the processor 130 inputs the consecutive frames into the event identification model. The event identification model is trained to determine whether the input consecutive frames include at least one event. The event identification model is a machine learning model, such as a convolutional neural network (CNN) model or a long short-term memory model (LSTM), etc., but may be not limited thereto.

In step S623, the processor 130 determines whether the at least one event is identified according to a model identification result. When the event identification model does not identify an event, the processor 130 may determine that the event identification model does not identify the at least one event according to the model identification result. When the event identification model identifies an event, the processor 130 may determine that the event identification model identifies the at least one event according to the model identification result.

When the processor 130 identifies the at least one event via the event identification model (determined as yes in step S623), in step S624, the processor 130 obtains the event information of the at least one event according to the model identification result. The model identification result output by the event identification model may include event identification information (i.e., the model identification result) and the target frame corresponding to the identified event. The processor 130 may acquire the event time information of the event according to the target frame corresponding to the identified event. For example, the event identification model may identify that the event occurs in the n-th target frame in the input consecutive frames, and the processor 130 may obtain the event time information on the recording timeline according to the n-th target frame. Accordingly, when the event identification model identifies an event according to a plurality of consecutive frames, the processor 130 may obtain the event identification information and the event time information of the identified event.

In step S630, the processor 130 selects a frame of the screen recording video according to the event information of one of the at least one event. The detailed implementation content of step S630 is described in the above embodiments, and is not repeated herein.

Moreover, when the processor 130 does not identify the at least one event via the event identification model (determined as no in step S623), in step S650, the processor 130 obtains a program preset time of the application recorded in metadata. In step S660, the processor 130 selects a frame of the screen recording video according to the program preset time. Lastly, in step S640, the processor 130 generates a thumbnail of the screen recording video using the frame associated with the application, and the thumbnail is displayed on a user interface via the display 110. The detailed implementation content of step S640 to step S660 is described in the above embodiments, and is not repeated herein.

In some embodiments, step S620 to step S660 shown in FIG. 6 may be implemented by the processor 130 executing a gallery application. That is, the operations of step S620 to step S660 may be implemented by a gallery application.

Figure 7A:
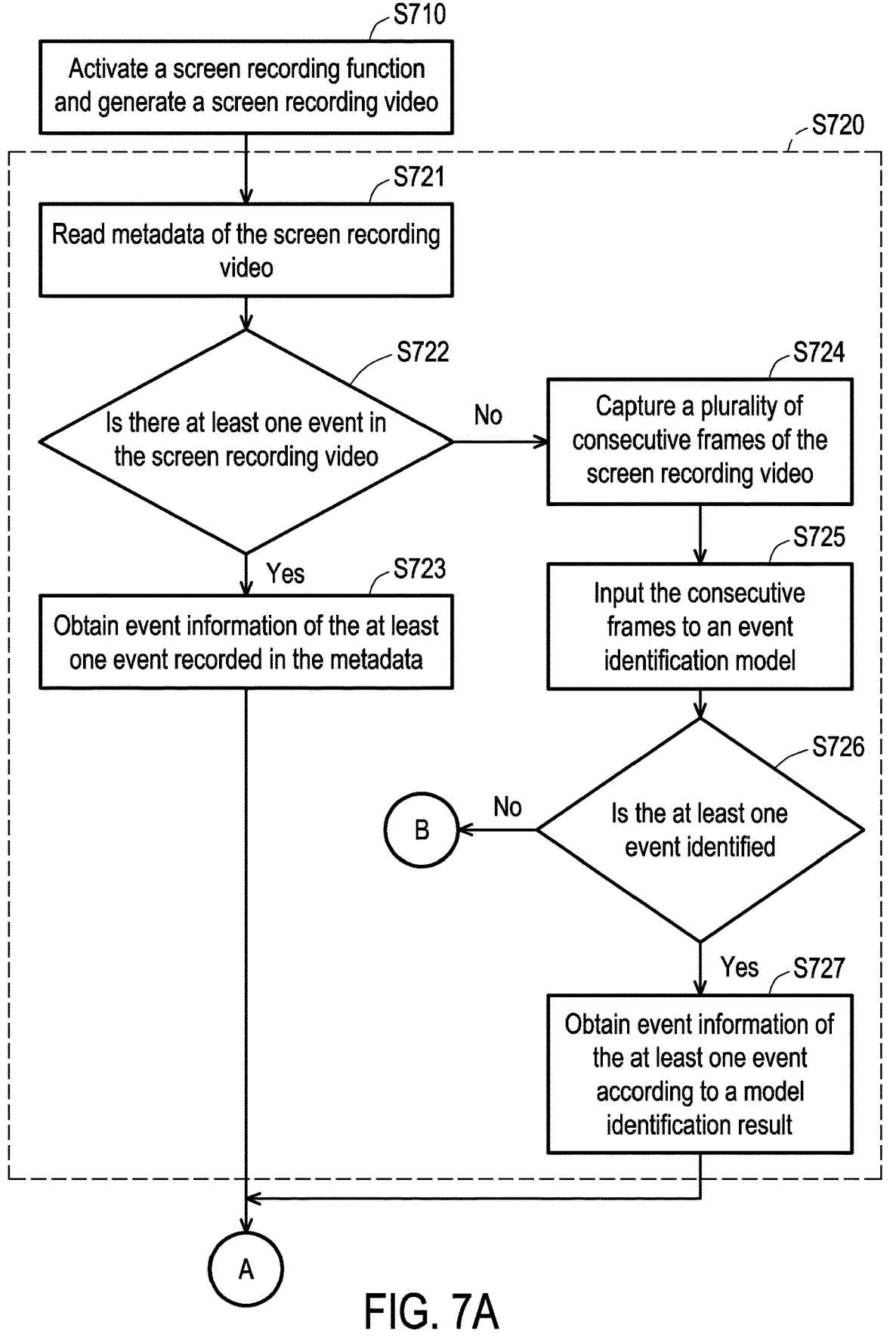
FIG. 7A and FIG. 7B are flowcharts of a thumbnail generation method for screen recording video of an embodiment of the present application.
Figure 7B:
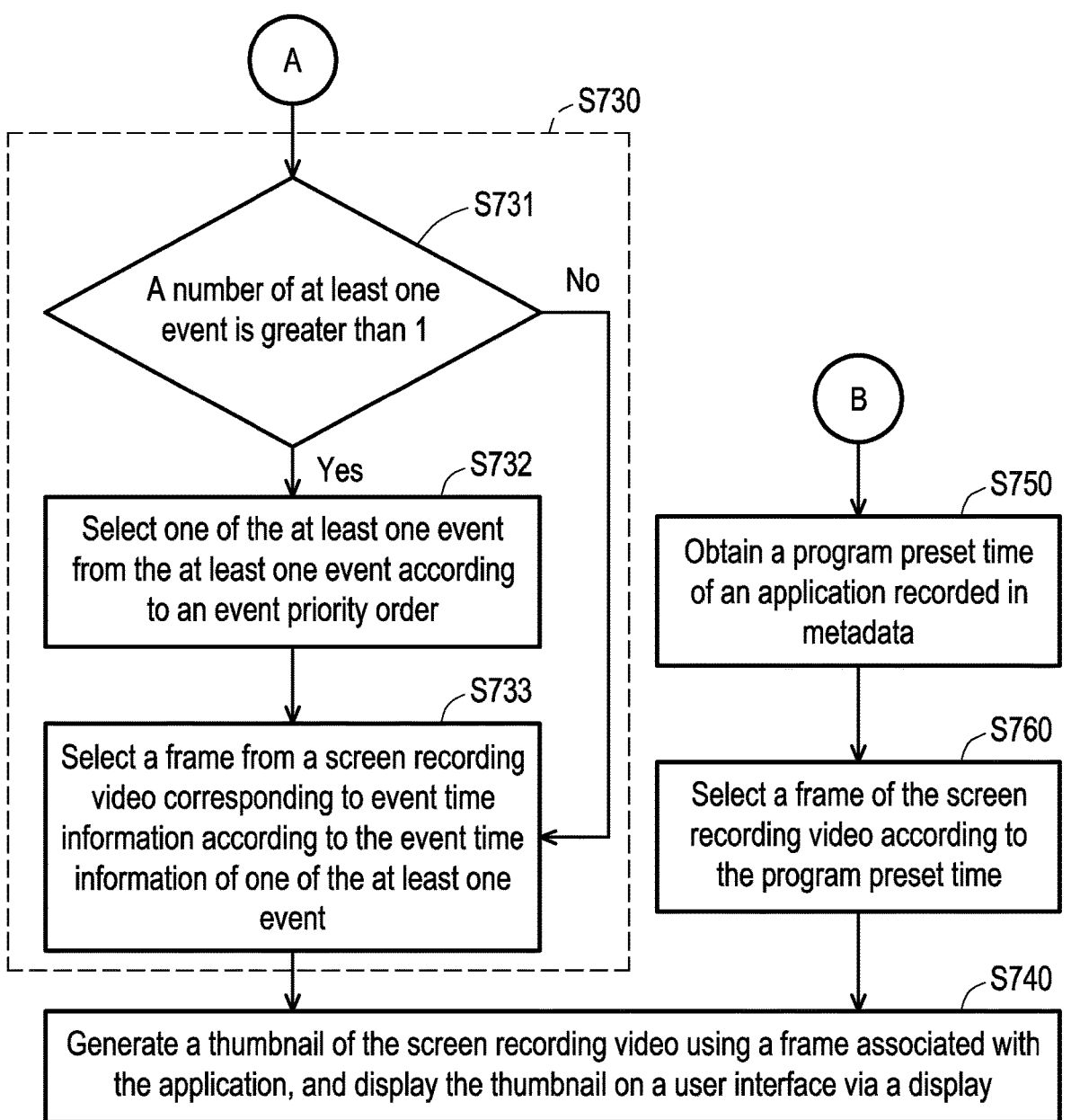

FIG. 7A and FIG. 7B are flowcharts of a thumbnail generation method for screen recording video of an embodiment of the invention. Referring to FIG. 1 and FIG. 7A and FIG. 7B, the method of the present embodiment is applicable to the electronic device 100 in the above embodiments. The detailed steps of the thumbnail generation method for screen recording video of the present embodiment are described below in conjunction with various elements in the electronic device 100.

In step S710, the processor 130 activates a screen recording function, and a screen recording video is generated. For example, the processor 130 may generate a screen recording video according to the operations shown in FIG. 5. In step S720, the processor 130 identifies at least one event of an application present in the screen recording video. In the present embodiment, step S720 may be implemented as step S721 to step S727.

In step S721, the processor 130 reads metadata of the screen recording video. In step S722, the processor 130 determines whether the at least one event is present in the screen recording video according to the metadata of the screen recording video. When the processor 130 determines that the at least one event is present in the screen recording video according to the metadata of the screen recording video (determined as yes step S722), in step S723, the processor 130 obtains event information of the at least one event recorded in the metadata.

When the processor 130 determines that the at least one event is not present in the screen recording video according to the metadata of the screen recording video (determined as no in step S722), in step S724, the processor 130 captures a plurality of consecutive frames of the screen recording video. In step S725, the processor 130 inputs the consecutive frames into an event identification model.

In step S726, the processor 130 determines whether the at least one event is identified according to a model identification result. When the processor 130 identifies the at least one event via the event identification model (determined as yes in step S726), in step S727, the processor 130 obtains the event information of the at least one event according to the model identification result.

In step S730, the processor 130 selects a frame of the screen recording video according to the event information of one of the at least one event. It should be mentioned that, in the present embodiment, step S730 may be implemented as step S731 to step S733.

In step S731, the processor 130 determines whether the number of the at least one event is greater than one. When the number of the at least one event is greater than 1, in step S732, the processor 130 selects one of the at least one event from the at least one event according to an event priority order. More specifically, when a plurality of events occur in the screen recording video, the processor 130 may select a frame corresponding to a high-priority event to generate a thumbnail. For example, different game event IDs may correspond to different event priority orders. When a plurality of game events appear in the screen recording video, the processor 130 may determine high-priority game events according to the event priority order corresponding to these game event IDs, so as to select the frames corresponding to the high-priority game events to generate thumbnails. Event priority orders corresponding to various game events may be pre-stored in the storage device 120. In addition, when the number of at least one event is not greater than 1 (that is, the screen recording video only includes one event), the processor 130 may omit performing step S732. Next, in step S733, the processor 130 selects the frame corresponding to event time information from the screen recording video according to the event time information of one of the at least one event.

Moreover, when the processor 130 does not identify the at least one event via the event identification model (determined as no in step S726), in step S750, the processor 130 obtains the program preset time of the application recorded in the metadata. In step S760, the processor 130 selects a frame of the screen recording video according to the program preset time. Lastly, in step S740, the processor 130 generates a thumbnail of the screen recording video using the frame associated with the application, and the thumbnail is displayed on a user interface via the display 110. The detailed implementation content of step S740 to step S760 is described in the above embodiments, and is not repeated herein.

Based on the above, in an embodiment of the invention, when the electronic device executes the screen recording function to generate the screen recording video, the electronic device may generate the thumbnail of the screen recording video according to the event occurring in the foreground application, and display the thumbnail of the screen recording video on the user interface. Accordingly, since the user may quickly understand the video content of the screen recording video by watching the thumbnail on the user interface, the user may quickly and correctly find the screen recording video of real interest to watch. It may be seen that the thumbnail generated by an embodiment of the invention may prevent the user from repeatedly opening a plurality of screen recording videos to find the screen recording video of real interest, thus significantly improving convenience.

Lastly, it should be mentioned that: each of the above embodiments is only used to describe the technical solutions of the invention and is not intended to limit the invention; and although the invention is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the invention.

What is claimed is:

1. A thumbnail generation method for screen recording video, adapted to an electronic device comprising a display, the method comprising:

activating a screen recording function and generating a screen recording video;

identifying at least one event of an application present in the screen recording video;

selecting a single frame of the screen recording video according to event information of one of the at least one event; and generating a thumbnail of the screen recording video by downscaling image resolution or image size of the selected single frame of the screen recording video of the application, and displaying the thumbnail on a user interface via the display, wherein the step of selecting the single frame of the screen recording video according to the event information of one of the at least one event comprises:

selecting one of the at least one event from the at least one event according to an event priority order; and selecting the single frame corresponding to event time information from the screen recording video according to the event time information of the selected one of the at least one event.

2. The thumbnail generation method for screen recording video of claim 1, wherein the step of identifying the at least one event present in the screen recording video comprises:

reading metadata of the screen recording video; and obtaining the event information of the at least one event recorded in the metadata, wherein the event information comprises event identification information and the event time information.

3. The thumbnail generation method for screen recording video of claim 2, wherein the step of activating the screen recording function and generating the screen recording video comprises:

recording the event information of the at least one event according to an event notification provided by the application during an execution of the screen recording function; and writing the event information of the at least one event into the metadata of the screen recording video when an end recording command is received.

4. The thumbnail generation method for screen recording video of claim 3, wherein the step of recording the event information provided by the application during the execution of the screen recording function comprises:

detecting a program name of the application running in a foreground of a screen during the execution of the screen recording function; and recording the event information of the at least one event according to an event notification provided by the application when the program name matches a specific program name.

5. The thumbnail generation method for screen recording video of claim 1, wherein the step of identifying the at least one event present in the screen recording video comprises:

capturing a plurality of consecutive frames of the screen recording video;

inputting the consecutive frames into an event identification model to identify the at least one event, and obtaining the event information of the at least one event according to a model identification result, wherein the event information comprises event identification information and event time information.

6. The thumbnail generation method for screen recording video of claim 1, the method further comprising:

obtaining a program preset time of the application recorded in metadata when the at least one event is not present in the screen recording video; and selecting the single frame of the screen recording video according to the program preset time.

7. The thumbnail generation method for screen recording video of claim 6, the method further comprising:

detecting a program name of the application running in a foreground of a screen during an execution of the screen recording function;

recording the program preset time of the application when the program name matches a specific program name; and writing the program preset time of the application into the metadata of the screen recording video when an end recording command is received.

8. The thumbnail generation method for screen recording video of claim 1, wherein the application comprises a game program, and the at least one event comprises at least one game event.

9. An electronic device, comprising:

a display;

a storage device recording a plurality of modules;

a processor coupled to the display and the storage device and executing the modules and configured to:

activate a screen recording function and generate a screen recording video;

identify at least one event of an application present in the screen recording video;

select a single frame of the screen recording video according to event time information in event information of one of the at least one event; and generate a thumbnail of the screen recording video using the selected single frame corresponding to the event time information, and display the thumbnail on a user interface via the display, wherein the processor is configured to:

select one of the at least one event from the at least one event according to an event priority order; and select the single frame corresponding to the event time information from the screen recording video according to the event time information of the selected one of the at least one event.

10. The electronic device of claim 9, wherein the processor is configured to:

read metadata of the screen recording video; and obtain the event information of the at least one event recorded in the metadata, wherein the event information comprises event identification information and the event time information.

11. The electronic device of claim 10, wherein the processor is configured to:

record the event information of the at least one event according to an event notification provided by the application during an execution of the screen recording function; and write the event information of the at least one event into the metadata of the screen recording video when an end recording command is received.

12. The electronic device of claim 11, wherein the processor is configured to:

detect a program name of the application running in a foreground of a screen during the execution of the screen recording function; and record the event information of the at least one event according to an event notification provided by the application when the program name matches a specific program name.

13. The electronic device of claim 9, wherein the processor is configured to:

capture a plurality of consecutive frames of the screen recording video;

input the consecutive frames into an event identification model to identify the at least one event, and obtain the event information of the at least one event according to a model identification result, wherein the event information comprises event identification information and the event time information.

14. The electronic device of claim 9, wherein the processor is configured to:

obtain a program preset time of the application recorded in the metadata when the at least one event is not present in the screen recording video; and select the single frame of the screen recording video according to the program preset time.

15. The electronic device of claim 14, wherein the processor is configured to:

detect a program name of the application running in a foreground of a screen during an execution of the screen recording function;

record the program preset time of the application when the program name matches a specific program name; and write the program preset time of the application into the metadata of the screen recording video when an end recording command is received.

16. The electronic device of claim 9, wherein the application comprises a game program, and the at least one event comprises at least one game event.

* * * * *